(12) United States Patent
Abril et al.

(10) Patent No.: US 7,504,121 B2
(45) Date of Patent: Mar. 17, 2009

(54) METHODS OF INCORPORATING POLYUNSATURATED FATTY ACIDS IN MILK

(75) Inventors: Jesus R. Abril, Westminster, CO (US); William R Barclay, Boulder, CO (US); Archimede Mordenti, Bologna (IT); Marco Tassinari, Bologna (IT); Alessandro Zotti, Bologna (IT)

(73) Assignee: Martek Biosciences Corporation, Columbia, MD (US)

( * ) Notice: Subject to any disclaimer, the term of this patent is extended or adjusted under 35 U.S.C. 154(b) by 830 days.

(21) Appl. No.: 10/312,106

(22) PCT Filed: Jun. 26, 2001

(86) PCT No.: PCT/US01/20471

§ 371 (c)(1),
(2), (4) Date: Mar. 28, 2003

(87) PCT Pub. No.: WO02/00028

PCT Pub. Date: Jan. 3, 2002

(65) Prior Publication Data

US 2003/0211221 A1 Nov. 13, 2003

Related U.S. Application Data

(60) Provisional application No. 60/214,291, filed on Jun. 26, 2000.

(51) Int. Cl.
A23L 1/00 (2006.01)
A23C 9/14 (2006.01)

(52) U.S. Cl. .................. 426/99; 426/34; 426/580; 426/635; 426/807

(58) Field of Classification Search .............. 426/99, 426/98, 65, 580, 34, 635, 807; 424/440, 424/43; 326/99, 65, 580
See application file for complete search history.

(56) References Cited

U.S. PATENT DOCUMENTS

| | | | | |
|---|---|---|---|---|
| 3,655,864 | A * | 4/1972 | Grass et al. | 424/438 |
| 5,106,639 | A * | 4/1992 | Lee et al. | 426/302 |
| 5,206,041 | A * | 4/1993 | Wellons | 426/2 |
| 5,698,244 | A | 12/1997 | Barclay | |
| 5,756,143 | A | 5/1998 | Cain et al. | |
| 5,874,470 | A | 2/1999 | Nehne et al. | |
| 5,908,654 | A | 6/1999 | Cain et al. | |
| 5,985,348 | A * | 11/1999 | Barclay | 426/580 |
| 6,245,366 | B1 | 6/2001 | Popplewell et al. | |
| 6,248,909 | B1 | 6/2001 | Akimoto et al. | |
| 6,258,964 | B1 | 7/2001 | Nakajima et al. | |
| 6,770,104 | B2 * | 8/2004 | Murphy | 44/275 |
| 7,001,610 | B2 * | 2/2006 | Stewart | 424/438 |
| 2002/0114877 | A1 * | 8/2002 | Stark et al. | 426/656 |
| 2003/0198730 | A1 * | 10/2003 | Stewart | 426/635 |

FOREIGN PATENT DOCUMENTS

| | | |
|---|---|---|
| EP | 0249282 | 12/1987 |
| EP | 0862369 | 9/1998 |
| JP | 08-336360 | * 3/1995 |
| JP | 08-336360 | 12/1996 |
| JP | 8-336360 | 12/1996 |
| WO | WO 92/12711 | 8/1992 |
| WO | WO 95/06414 | 3/1995 |
| WO | WO 96/40106 | 12/1996 |
| WO | WO 97/37546 | 10/1997 |
| WO | WO 98/18338 | 5/1998 |
| WO | WO 00/24360 | 5/2000 |
| WO | WO 01/80656 | 11/2001 |

OTHER PUBLICATIONS

Encyclopedia, University of Pennsylvania Health System, Definition of Fats, 3 pages, downloaded from http://pennhealth.com/ancy/article/002468 on Sep. 4, 2007.*
'The Hydrogenation of Alkenes', 5 pages downloaded from http://www.chemguide.co.uk/organicprops/alkenes/hydrogenation.html on Sep. 4, 2007.*
Bailey's Industrial Oil and Fat Products, vol. 1, 4th edition (1979).*
The Merck Index, 8th edition (1968).*
Papadopoulos et al., "Effects of Dietary Supplements of Algae, Containing Polyunsaturated Fatty Acids, on Milk Yield and the Composition of Milk Products in Dairy Ewes," *J. Dairy Research*, vol. 69, (2002), pp. 357-365.
Hagemeister et al.; "Studies on Transfer of Omega-3 Fatty Acids Into Bovine Milk Fat"; *Milchwissenschaft*, 1988; vol. 43, No. 3; pp. 153-158.
European Search Report of European Patent Application No. 01952255.6 dated Jul. 21, 2004.
Franklin et al., "Dietary marine algae (*Schizochytrium* sp.) increases concentrations of conjugated linoleic, docosahexaenoic and transvaccenic acids in milk of dairy cows", Nutrient Metabolism, 1999, pp. 2048-2054.
Gunstone et al., The Lipid handbook, second edition, 1992, pp. 170, 171, 176, 177.
The Lipid Handbook, second edition, F.D. Gunstone, pp. 170, 171, 176, 177 (1992) (5 pages).
Dietary marine algae (*Schizochytrium* sp.) increases concentrations of conjugated linoleic, docosahexaenoic and transvaccenic acids in milk of dairy cows, S.T. Franklin et al.; Nutrient Metabolism; pp. 2048-2054 (1999) (7 pages).

* cited by examiner

*Primary Examiner*—C. Sayala
(74) *Attorney, Agent, or Firm*—Sheridan Ross P.C.

(57) ABSTRACT

Method for incorporating polyunsaturated fatty acids into milk with improved efficiency. The methods include protecting the polyunsaturated fatty acids, including omega-3 and omega-6 polyunsaturated fatty acids, with a protective agent prior to feeding the fatty acids to a milk producing animal. Methods for feeding polyunsaturated fatty acids to milk producing animals by top dressing a polyunsaturated fatty acid supplement on top of animal feed compositions and methods of making and using such compositions are also provided.

2 Claims, 1 Drawing Sheet

US 7,504,121 B2

METHODS OF INCORPORATING POLYUNSATURATED FATTY ACIDS IN MILK

CROSS-REFERENCE TO RELATED APPLICATIONS

This application is a national stage application under 35 U.S.C. § 371 of PCT Application Ser. No. PCT/US01/20471, filed Jun. 26, 2001, which claims the benefit of priority from U.S. Provisional Application Ser. No. 60/214,291, filed Jun. 26, 2000.

FIELD OF THE INVENTION

The present invention relates to methods of incorporating polyunsaturated fatty acids in milk with increased efficiency. More particularly, the methods include protecting polyunsaturated fatty acids, such as omega-3 and omega-6 polyunsaturated fatty acids, with a protective agent prior to feeding the supplement to a milk-producing animal. The invention further provides methods of feeding the polyunsaturated fatty acids to milk-producing animals by top dressing the polyunsaturated fatty acid supplement onto regular feed to increase the incorporation efficiency of the polyunsaturated fatty acids into milk.

BACKGROUND OF THE INVENTION

It is desirable to increase polyunsaturated fatty acid (PUFA) content of milk to help increase the dietary intake of these beneficial fatty acids. For example, omega-3 unsaturated fatty acids are recognized as important dietary compounds for preventing arteriosclerosis and coronary heart disease, for alleviating inflammatory conditions and for retarding the growth of tumor cells. For children, it would also be desirable to increase both the omega-3 (especially DHA, C22:6n-3) and the omega-6 fatty acid content of milk as the eicosanoids from the omega-6 fatty acids are important for growth and DHA is important in brain and nervous system development. Milk is not only an important food source in its own right, but it can also be used to make a wide variety of other dairy products, such as butter, yogurt, cheese and the like.

One way to enrich omega-3 and omega-6 PUFAs in milk is to increase the content of these fatty acids in the feed ration of ruminants. However, it has been found that ruminants fed high concentrations of long chain unsaturated fat in their feed rations can sometimes exhibit one or more of the following results: (1) reduced milk output; (2) decreased fat content in the milk; (3) decreased protein content in the milk; and (4) increased trans-fatty acid content in the milk.

Accordingly, it would be desirable to have improved methods of producing PUFA-enriched milk. The present invention satisfies this desire and provides related advantages as well.

SUMMARY OF THE INVENTION

The present invention generally relates to methods of increasing the efficiency of producing milk enriched with omega-3 and/or omega-6 polyunsaturated fatty acids (PUFAs). In one aspect, the invention relates to the protection of PUFAs with a protective fat. The invention further provides compositions containing omega-3 and/or omega-6 polyunsaturated fatty acids and a protective fat, and to methods of making and using such compositions.

The source of the PUFAs can be from any animal, plant or microbial source. A preferred source of the polyunsaturated fatty acids is a microorganism, particularly algae. The microorganism can be used in a whole cell form or as a lipid extracted from the microorganism. Preferably, the microorganism is from the order Thraustochytriales, more preferably from the genus *Thraustochytrium* or *Schizochytrium*, and in particular *Schizochytrium* sp. (ATCC 20888 and ATCC 20889). (There has been some discussion in the taxonomic community as to whether the genus *Ulkenia* in the order Thraustochytriales is really separate from the genus *Schizochytrium*. For the purpose of this application we follow the current scientific consensus that Ulkenia is not a valid genus and species formerly described as "*Ulkeniia*" are really members of the genus *Schizochytrium*.) Oil seeds including genetically modified oil seeds, can also be used as the source of the PUFAs, including soybeans, flax, sunflower, safflower, rapeseed and canola for example. The seeds or oils extracted from the seeds can be used.

Although a particularly useful protective fat is tristearine, other tri-saturated triacylglycerols (e.g. tri-palmitine or tri-myristine), or di-saturated triacylglycerols which are preferably solid at room temperatures can also be used. Forms of other protective fats such as tallow, lard and calcium salts of fatty acids, for example, are also useful. Functional derivatives of these specific fats are also contemplated for use in the compositions and methods of the present invention. Other protective agents can also be used, including protected forms of casein and soy proteins, for example.

Preferably, the desired PUFA and the protective fat is combined in a ratio ranging from about 1:10 to about 10:1 (protective fat:PUFA), more preferably in a ratio ranging from about 1:5 to about 5:1, more preferably in a ratio ranging from about 1:1 to about 3:1 and more preferably in a ratio of about 2:1.

Various methods of making and using the compositions are also provided. Methods of making the compositions of the present invention are generally accomplished by obtaining an omega-3 and/or omega-6 PUFA and combining the protective fat with the PUFA to produce the composition. Additionally, methods of producing milk enriched with omega-3 PUFA, omega-6 PUFA or a combination thereof are also provided in which an animal capable of producing milk is fed the composition of the present invention. The milk-producing animal can be a cow, sheep, goat, bison, buffalo, antelope, deer or camel. Optionally, the methods further include extracting milk from the animal to obtain the enriched milk as well as producing a dairy product from the enriched milk, such as cheese, butter, yogurt and the like.

In another aspect, the invention also relates to a novel method of feeding milk-producing animals to increase the production of PUFA-enriched milk. The method involves adding a layer of a PUFA supplement on top of regular feed and feeding the animal the layered feed. The PUFA supplement can contain either protected or unprotected PUFAs. The methods can further include extracting the PUFA-enriched milk from the animal.

DETAILED DESCRIPTION OF THE INVENTION

Figure 1:
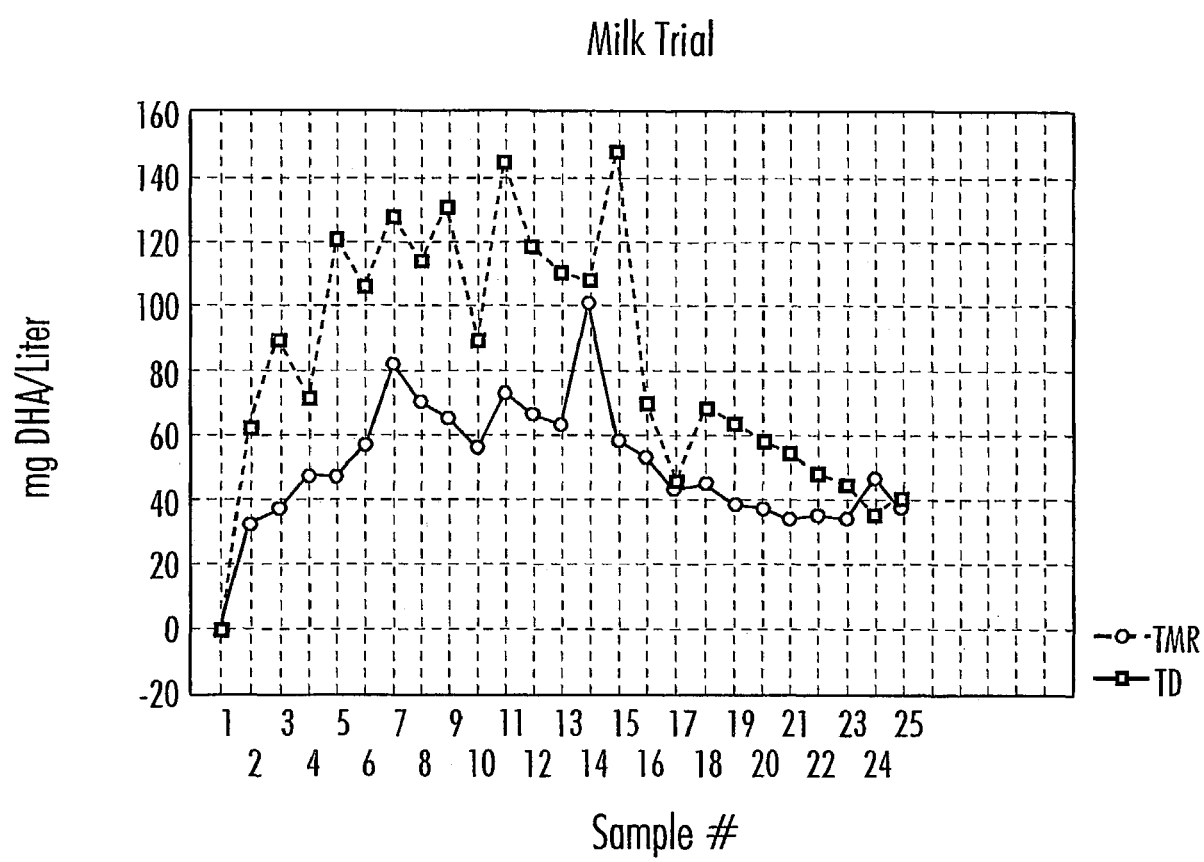
FIG. 1 is a graph comparing the amount of DHA (mg/l) in milk produced by cows fed DHA-rich microalgae supplement in a total mixed ration versus top dressed on the feed.

The present invention generally relates to the discovery of improved methods for producing milk enriched with omega-3 PUFA, omega-6 PUFA or a combination of these PUFAs.

In one aspect of the invention, it has now been discovered that feeding milk-producing animals, particularly ruminants, the long chain omega-3 and/or omega-6 polyunsaturated fatty acids along with a protective fat allows for significant enrichment of the PUFA content of milk while limiting one or more of the following: reductions in milk production, decreases in fat content, decreases in protein content, and/or increases in trans-fatty acid content, when compared to animals fed a non-enriched diet.

The compositions of the present invention include an omega-3 PUFA, an omega-6 PUFA or a combination of the two and a protective fat. Preferred PUFAs include any omega-3 or omega-6 polyunsaturated fatty acids with three or more double bonds. Omega-3 PUFAs are polyethylenic fatty acids in which the ultimate ethylenic bond is three carbons from and including the terminal methyl group of the fatty acid and include, for example, docosahexaenoic acid C22:6(n-3) (DHA), eicosapentaenoic acid C20:5(n-3)(EPA), omega-3 docosapentaenoic acid C22:5(n-3) (DPAn-3), stearidonic acid C18:4(n-3) (SDA), and linolenic acid C18:3(n-3)(LNA). Omega-6 PUFAs are polyethylenic fatty acids in which the ultimate ethylenic bond is six carbons from and including the terminal methyl group of the fatty acid and include, for example, arachidonic acid C20:4(n-6) (ARA), C22:4(n-6), omega-6 docosapentaenoic acid C22:5(n-6) (DPAn-6), gammalinolenic acid C18:3(n-6) (GLA) and dihomogammalinolenic acid C20:3(n-6)(dihomo GLA). The PUFAs can be in any of the common forms found in natural lipids including but not limited to triacylglycerols, diacylglycerols, phospholipids, free fatty acids, esterified fatty acids, or in natural or synthetic derivative forms of these fatty acids (e.g. calcium salts of fatty acids, ethyl esters, etc). Suitable PUFAs for the present compositions can also include any combination of omega-3 PUFAs and/or omega-6 PUFAs.

Any source of PUFAs can be used in the compositions and methods of the present invention, including, for example, animal, plant and microbial sources. Sources of the PUFAs and methods for processing and isolating the PUFAs preferably include those described in U.S. Pat. No. 5,340,594, issued Aug. 23, 1994 and in U.S. Pat. No. 5,698,244, issued Dec. 16, 1997, both incorporated herein by reference in their entirety. For example, strains of fungi, algae or protists can be isolated that contain the PUFAs. The organism, such as algae for example, is preferably fed to the animal in a whole cell form or alternatively as an extracted lipid. Preferably, the organism is selected from the order Thraustochytriales, more preferably from the genus *Thraustochytrium* or *Schizochytrium*, and particularly *Schizochytrium*. Preferred strains are the deposited *Schizochytrium* sp. strains ATCC 20888 and 20889 and derivatives thereof.

It is especially desirable to use a microbial source of long chain polyunsaturated fatty acids. These PUFAs are naturally encapsulated in the microbial cell wall, which can function as a natural protective barrier. Although feeding the whole-cell microbes themselves can readily lead to an increase in polyunsaturated fatty acid content of the milk, decreased milk production and the other side effects noted above can sometimes occur depending on the amount of natural protection provided by the microbial cell wall.

Oil seeds, such as soybean, flax, sunflower, safflower, rapeseed and canola for example, are also useful as sources of the PUFAs. Preferably, oil seeds that have been genetically modified to increase the PUFA content can be employed. The oil seeds or oil extracted from the seeds can be used. Methods of extracting oil from seeds are known to those skilled in the art. Animal sources, such as fish, can also be used as a source of PUFAs.

While not wishing to be bound by any theory, it is believed that the addition of a protective fat to the PUFAs provides a high quality stable source of the unsaturated fatty acids, which, because of the protective fat, is not, for example, degraded or hydrogenated in the rumen, but is easily digested or absorbed in the stomach of the ruminant. It is believed that the protective fats protect the PUFAs from degradation or hydrogenation by the rumen microflora prior to digestion and absorption of the PUFAs by the animal. While not wishing to be bound by any theory, it is believed that the PUFAs can be "protected" by coating or encapsulating the lipids or whole cells allowing the fatty acids to pass relatively undamaged through the ruminant's first stomach. As a result, milk is produced at a substantially normal rate and the resulting milk is enriched in polyunsaturated fatty acids, has substantially normal fat and protein content, no significant increases in trans-fatty acids, and/or has excellent organoleptic qualities.

As used herein, the terms "protective fat" also commonly called "by-pass fat" includes any suitable fat that can encapsulate, coat or otherwise protect the PUFAs from significant degradation or saturation, while allowing the PUFAs to be easily absorbed by the animal. Suitable protective fats include, for example, tristearine, although other tri-saturated triacylglycerols such as tripalmitine or trimyristine, or di-saturated triacylglycerols which are solid at room temperatures can also be used, tallow and calcium salts of fatty acids, and/or functional derivatives of any of these fatty acids. The term "functional derivative" include any homologues or other derivatives of these protective fats that can encapsulate, coat or otherwise protect the PUFAs from degradation or hydrogenation by rumen microflora. Such functional derivatives can be readily identified, synthesized or obtained by those skilled in the art. Milk is considered enriched when it has at least 20 percent more, preferably at least 50 percent more, preferably at least 100 percent more, preferably at least 200 percent more and more preferably at least 400 percent more PUFAs then a control milk. Preferably, the PUFAs are highly unsaturated fatty acids such as DHA, EPA, SDA, LNA, DPAn-3, DPAn-6, C22:4(n-6), ARA, GLA and dihomo GLA.

Methods of making the compositions are also provided which include obtaining the omega-3 and/or omega-6 PUFA and combining it with a protective fat. Preferably, the PUFA and protective fat are combined in a ratio ranging from about 1:10 to about 10:1 (protective fat:PUFA), more preferably from about 1:5 to about 5:1, more preferably from about 1:1 to about 3:1 and more preferably in a ratio of about 2:1. The desired ratio of protective fat and PUFA are mixed together and preferably dried in the form of a flake or prilled product to form the PUFA supplement. In these forms the protective fat serves at least one of two functions: (1) to protect the PUFAs from hydrogenation or degradation in the rumen and releasing them later in the cows digestive system to be absorbed by the cow; and (2) to provide a source of by-pass fat to maintain milk fat and protein content, and maintain normal milk production in the presence of a high PUFA content feed ration.

Alternatively, if the microbial or other natural source of the PUFAs has good natural protection in the rumen (e.g. is protected by natural encapsulation by the microbial cell wall), the by-pass fat can be fed just mixed in the ration with the PUFA source rather than encapsulating it. In this way the by-pass fat serves to maintain milk fat content (and/or milk protein and/or total milk production) while the PUFA source serves primarily to enrich the milk with PUFAs.

The present invention further provides methods of using the compositions. In one embodiment, methods involve producing milk enriched with omega-3 PUFA, omega-6 PUFA or a combination thereof (referred to herein as "enriched milk") in a milk-producing animal. The term "milk" as used herein refers to a mammary gland secretion of an animal that forms a natural food. Milk-producing animals include, for example, ruminants such as cows, sheep, goats, bison, buffalo, antelope, deer, and camel, as well as other non-ruminant animals and humans. The methods are generally accomplished by feeding the animals an effective amount of a composition of the present invention to produce enriched milk. These methods are also useful for nursing females to provide enriched milk to their offspring.

In a further embodiment, the present invention also provides methods for obtaining enriched milk. The methods are generally accomplished by feeding a milk-producing animal an effective amount of a composition of the present invention to produce enriched milk and extracting the milk (e.g., milking) from the animal to obtain the enriched milk. Any method for extracting milk from the lactating animal can be used to collect the enriched milk. The enriched milk can also be further processed to produce a dairy product, such as cheese, butter, yogurt, sour cream, and the like.

In the methods of the present invention, the effective amounts of the omega-3 and/or omega-6 PUFAs to feed to the animals can be readily determined by those skilled in the art using the guidance provided herein. In one embodiment, a particularly useful range of omega-3 PUFA is from about 0.1 mg to about 100 mg PUFA/kg body weight/day, preferably from about 0.5 mg to about 50 mg PUFA/kg body weight/day, and more preferably from about 0.75 mg to about 20 mg PUFA/kg body weight/day. In another embodiment, a particularly useful range of omega-3 PUFA is from about 0.1 mg to about 750 mg PUFA/kg body weight/day, preferably from about 1 mg to about 500 mg PUFA/kg body weight/day, preferably from about 2 mg to about 250 mg PUFA/kg body weight/day, and more preferably from about 5 mg to about 100 mg PUFA/kg body weight/day. Preferably, the omega-3 and/or omega-6 PUFA is fed in an amount greater than about 2 mg/kg body weight/day. Greater amounts of omega-3 PUFA can be fed to an animal, including greater than about 5 mg/kg body weight/day, greater than about 30 mg/kg body weight/day, greater than about 75 mg/kg body weight/day and greater than about 150 mg/kg body weight/day. An appropriate dose of PUFA can vary with the particular PUFA and amount desired in the enriched milk and can be readily determined by those skilled in the art, e.g., by measuring the PUFA content of the enriched milk.

The present invention further relates to novel methods of feeding milk-producing animals to increase the amount of PUFAs in milk. The methods are generally accomplished by adding a layer of a desired PUFA (e.g., omega-3 PUFA, omega-6 PUFA or a combination of the two) on top (referred to herein as "top dressing") of regular feed not supplemented with PUFAs or containing less PUFAs than the top layer, and feeding the layered feed to a milk-producing animal. The PUFA layer or supplement can contain either protected PUFAs as described above or unprotected PUFAs (i.e., PUFAs without protective fats or agents). The amount of PUFA in the PUFA supplement is preferably as described above. The methods can further include extracting or milking the animal to obtain the PUFA-enriched milk.

The following examples are intended to illustrate, but not limit, the present invention.

EXAMPLE 1

Fifteen Italian Friesan breed dairy cows (10-40 days from calving) were randomly divided into three groups of five cows each. Group 1 cows were fed a diet of barley silage (54.33%), alfalfa hay (10.35%), barley meal (11.64%), a dairy concentrate (23.29%) (containing carob, flaked barley, flaked corn, soybean meal, coconut butter, zeolites and vitamin E) and a vitamin-mineral premix (0.3%). The other two groups were fed the same diet except that some of the soybean meal and coconut butter in the dairy concentrate were substituted with either drum-dried *Schizochytrium* sp. ATCC 20888 produced by fermentation (Group 2) or drum-dried *Schizochytrium* sp. ATCC 20888 produced by fermentation that had been encapsulated in tristearine (2 parts tristearine to 1 part dried *Schizochytrium* sp. ATCC 20888) (Group 3). *Schizochytrium* sp. ATCC 20888 is a microalgae rich in both the long chain unsaturated fatty acids DHA (C22:6n-3) and DPAn-6 (C22:5n-6). All the rations contained approximately the same proximate nutrient content: dry matter (DM) content (92%), crude protein content (16% DM), fat content (6.7% DM as ether extract) and crude fiber content (26-27% DM).

The cows were fed these rations for 6 weeks. The polyunsaturated fatty acid content of the resulting milk from each group on the last day of supplementation is outlined in Table 1. Results are the mean fatty acid content of the milk from each group on the last day of an approximate 6 week period of supplementation. The results indicate that the by-pass (i.e., protective) fat protected microalgae supplement resulted in the highest increase in both omega-3 long chain (LCn-3) and omega-6 long chain unsaturated fatty acids. Milk production, milk fat and protein content (mean±standard deviation) are listed in Table 2. Results are averaged from 5 cows per treatment and from 12 milkings/cow over a 2 month period. The results for the protected microalgae indicate that there was no significant difference in any of these parameters compared to the control milk, while the unprotected microalgae supplement form, while effective in increasing the long chain omega-3 and omega-6 fatty acid content of the milk, led to small decreases in milk production and milk fat content. There also was no significant difference in trans-fatty acid content among the three treatment groups.

TABLE 1

Content of fatty acids (mg/L) in milk from cows fed a supplement containing by-pass fat protected whole-cell microalgae compared to milk from cows fed whole cell microalgae (unprotected)supplement or cows fed a control ration without any algal supplement.

| Fatty Acid | Control | Unprotected microalgae | Protected microalgae |
|---|---|---|---|
| C18:2 (n-6) | 796 | 598 | 818 |
| C18:3 (n-3) | 94 | 94 | 130 |
| C20:4 (n-6) | 63 | 58 | 69 |
| C20:5 (n-3) | 14 | 20 | 20 |
| C22:5 (n-6) | 3 | 32 | 35 |
| C22:5 (n-3) | 18 | 14 | 19 |
| C22:6 (n-3) | 2 | 98 | 114 |
| Total (n-3) | 128 | 226 | 283 |
| Total (LCn-3) | 34 | 132 | 153 |
| n-6:n-3 ratio | 7 | 3 | 3 |

TABLE 2

Milk production, milk fat (%) and milk protein content (%) from cows fed a supplement containing by-pass fat protected whole-cell microalgae compared to milk from cows fed whole cell microalgae (unprotected) supplement or cows fed a control ration without any algal supplement.

| Dietary Treatment | Milk Production (kg milk/milking) | Milk Fat (%) | Milk Protein (%) |
|---|---|---|---|
| Control feed ration | 16.3 ± 1.8 | 3.4 ± 0.2 | 2.8 ± 0.2 |
| Feed ration with added unprotected DHA/DPA microalgae | 15.4 ± 2.6 | 2.8 ± 0.5 | 2.9 ± 0.2 |
| Feed ration with added DHA/DPA microalgae protected by by-pass fat encapsulation | 17.7 ± 2.7 | 3.2 ± 0.4 | 2.9 ± 0.2 |

EXAMPLE 2

Two independent groups of dairy cows, 40 each, were selected to test milk enrichment with docosahexaenoic acid (DHA), using DHA-rich microalgae feed. Both groups of cows had an average milk production of 22 kg (milking twice a day, morning and evening), were of similar age, lactation period and gestation stage. The average weight of the animals was 600 kg, and the animals were of the German Hemental breed.

The two groups of cows were fed 30 g of DHA/day/head in the form of dried DHA-rich microalgae. One group of cows received microalgae as part of a total mixed ration (TMR) and the other group received the microalgae as a top dressing (TD) on their feed.

Milk samples were collected at the milking parlor, in the morning and evening, the two samples pooled and analyzed for fatty acids. Samples were collected for 40 days, and at the end of 40 days, DHA supplement was discontinued and samples were collected for the following 10 days to observe DHA washout.

The animals received a typical ration for the region where the trial was conducted consisting of: Wheat/barley/corn, barley hay, straw hay, short cut hay, corn silage, molasses and 44% soy.

As shown in Table 3, an unexpected result was obtained where the top dressed milk samples exhibited a higher DIA enrichment, 120 mg/l, as compared to the total mixed ration milk samples, 68 mg/l. Data is the average of eleven samples taken during peak DHA enrichment (sample numbers 4-15 in Table 4). Milk production and feed intake were not affected by the introduction of the DHA-rich microalgae supplement in the diet.

TABLE 3

Average DHA concentration (mg/L) in milk from cows fed a DHA-rich microalgal supplement mixed completely within the ration (TMR) compared to cows fed the supplement top dressed (TD) on their normal feed ration.

| Variable | Valid N | Mean | Minimum | Maximum | Standard Dev. |
|---|---|---|---|---|---|
| TMR | 11 | 68.0 | 48.0 | 101.0 | 14.4 |
| TD | 11 | 120.0 | 90.0 | 148.0 | 17.2 |

TABLE 4

DHA concentration (mg/L) in samples of milk from cows fed a DHA-rich microalgal supplement mixed completely within the ration (TMR) compared to milk from cows fed the supplement top dressed (TD) on their normal feed ration.

| SAMPLE NO. | VAR1 | TMR | TD |
|---|---|---|---|
| 1 | 1.000 | 0.000 | 0.000 |
| 2 | 2.000 | 33.000 | 63.000 |
| 3 | 3.000 | 38.000 | 90.000 |
| 4 | 4.000 | 48.000 | 72.000 |
| 5 | 5.000 | 48.000 | 121.000 |
| 6 | 6.000 | 58.000 | 106.000 |
| 7 | 7.000 | 83.000 | 128.000 |
| 8 | 8.000 | 71.000 | 114.000 |
| 9 | 9.000 | 66.000 | 131.000 |
| 10 | 10.000 | 57.000 | 90.000 |
| 11 | 11.000 | 74.000 | 145.000 |
| 12 | 12.000 | 67.000 | 119.000 |
| 13 | 13.000 | 64.000 | 111.000 |
| 14 | 14.000 | 101.000 | 108.000 |
| 15 | 15.000 | 59.000 | 148.000 |
| 16 | 16.000 | 54.000 | 71.000 |
| 17 | 17.000 | 44.000 | 46.000 |
| 18 | 18.000 | 46.000 | 69.000 |
| 19 | 19.000 | 39.000 | 64.000 |
| 20 | 20.000 | 38.000 | 59.000 |
| 21 | 21.000 | 35.000 | 55.000 |
| 22 | 22.000 | 36.000 | 49.000 |
| 23 | 23.000 | 35.000 | 45.000 |
| 24 | 24.000 | 47.000 | 36.000 |
| 25 | 25.000 | 38.000 | 41.000 |

Those skilled in the art will appreciate that numerous changes and modifications may be made to the preferred embodiments of the invention and that such changes and modifications may be made without departing from the spirit of the invention. It is therefore intended that the appended claims cover all such equivalent variations as fall within the true spirit and scope of the invention.

What is claimed is:

1. A method of producing PUFA-enriched milk, comprising the steps of:
   (a) adding a top dressing layer comprising omega-3 PUFA, omega-6 PUFA, or a combination thereof on top of feed to form a top dressed feed, wherein the PUFA top dressing layer contains an effective amount of PUFA to produce PUFA-enriched milk; and
   (b) feeding said top dressed feed to a milk-producing animal.

2. The method of claim 1 further comprising the step of extracting PUFA-enriched milk from the milk-producing animal.

* * * * *